April 23, 1957    A. J. BUTTERWORTH    2,789,548
VALVE GEARS WITH TORSION ROD SPRINGS
Filed Dec. 11, 1953      5 Sheets-Sheet 1
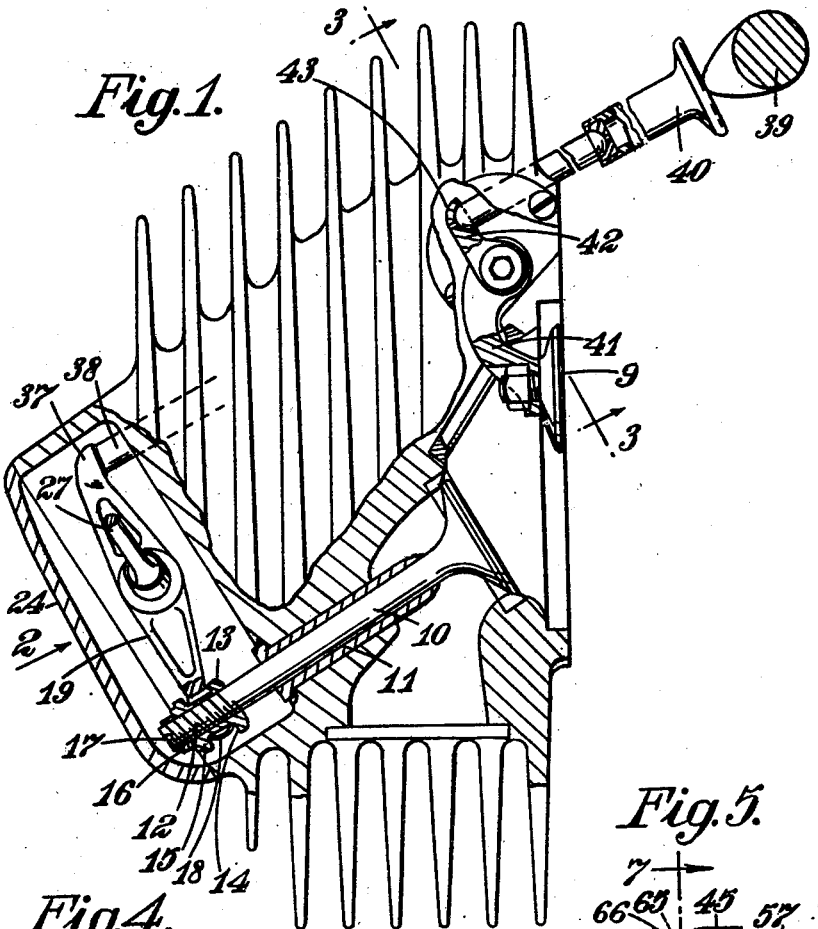
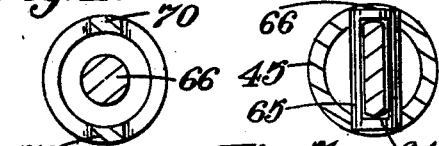
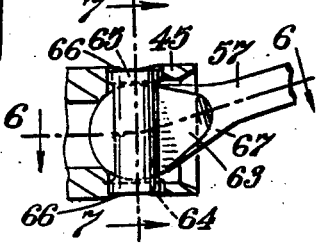
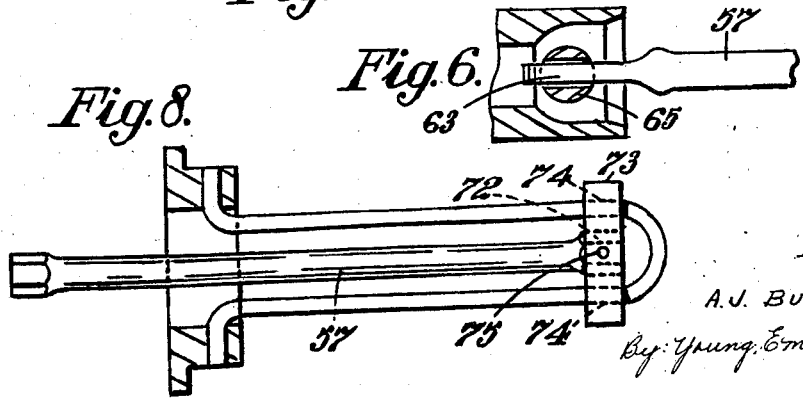
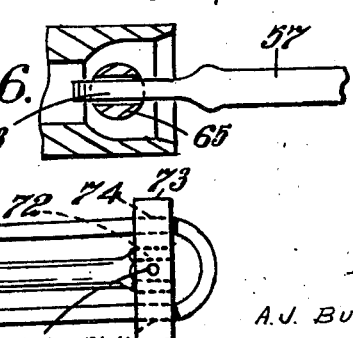
INVENTOR
A. J. BUTTERWORTH
By: Young, Emery & Thompson
Att'ys.

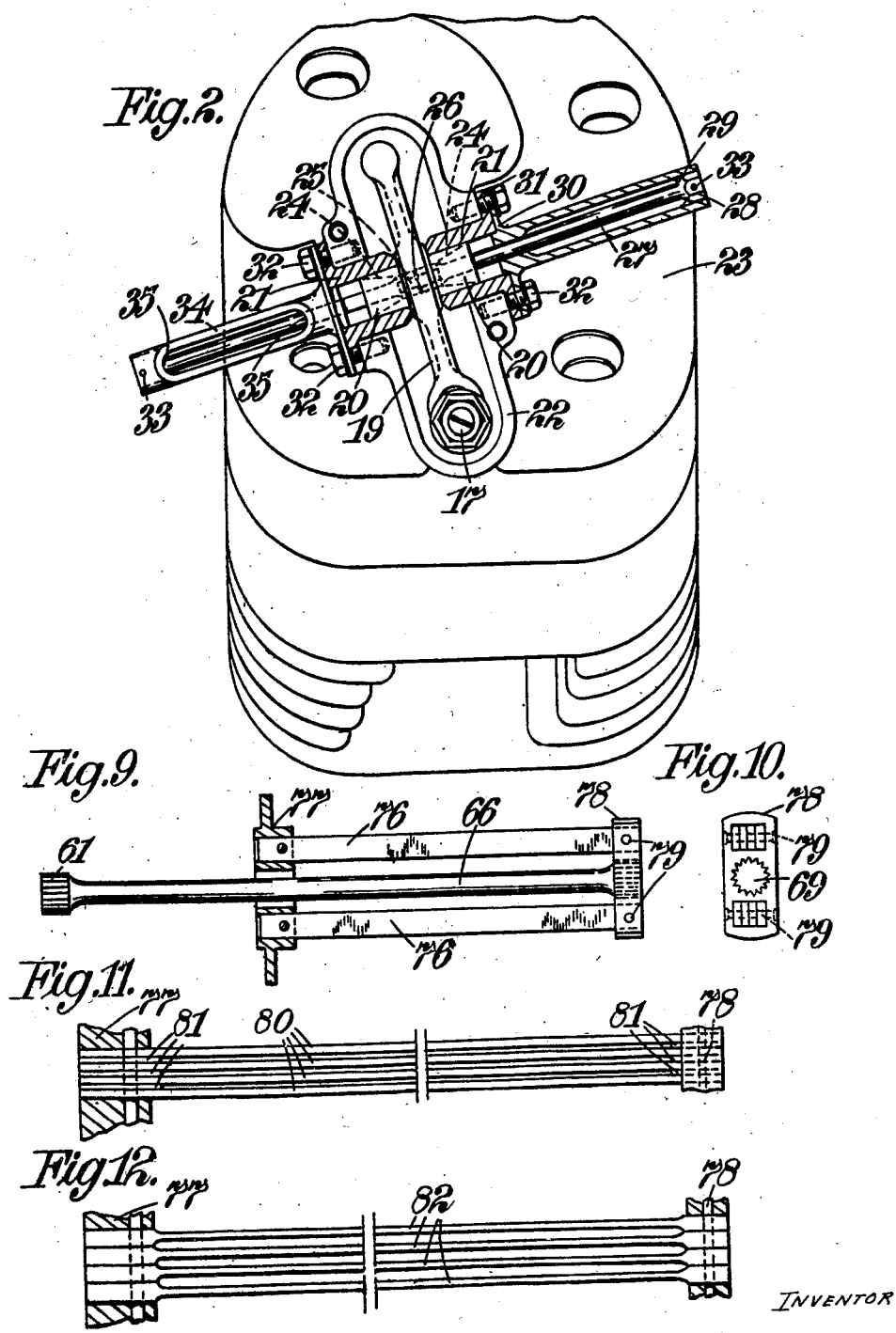

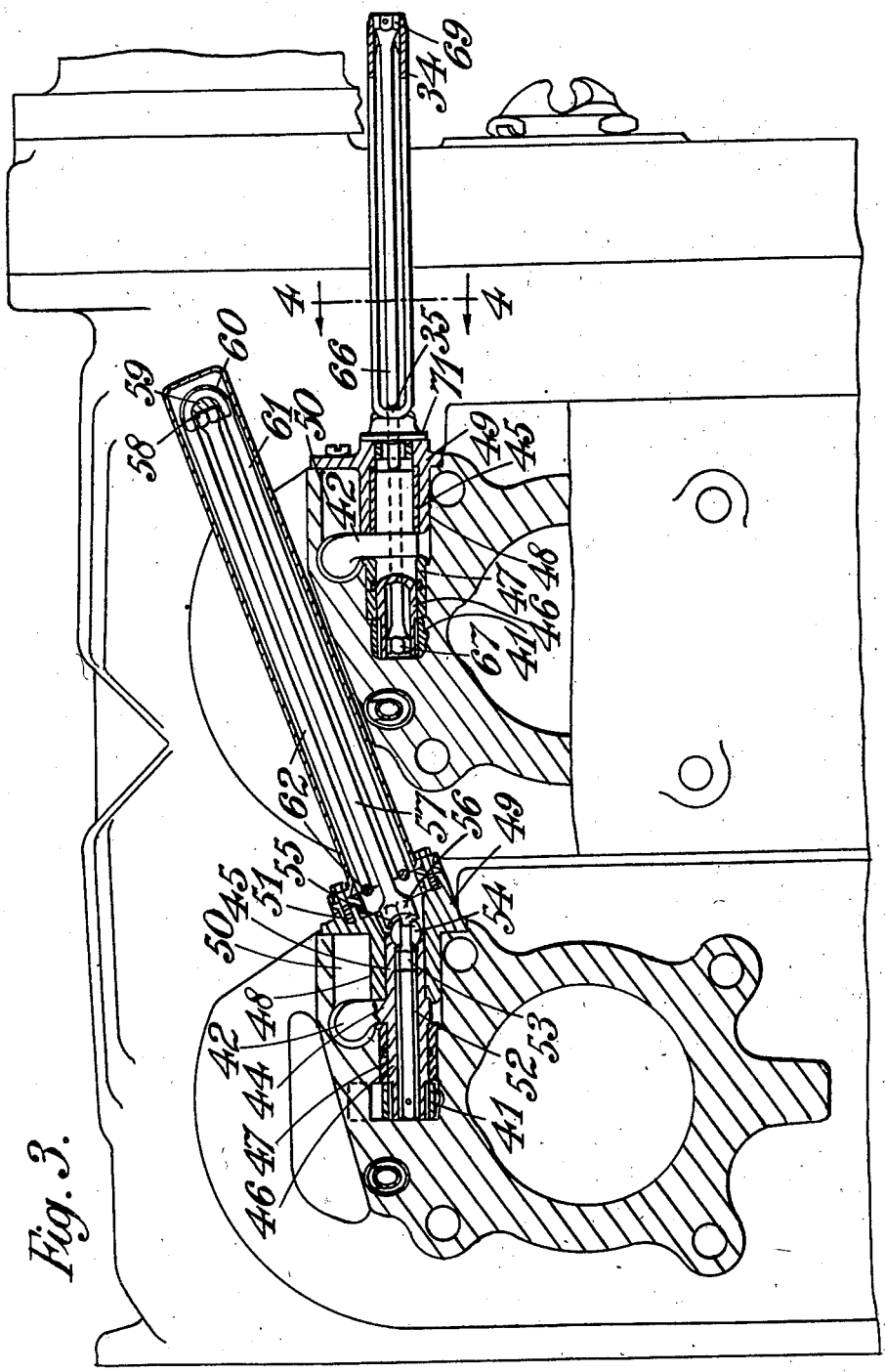

April 23, 1957  A. J. BUTTERWORTH  2,789,548
VALVE GEARS WITH TORSION ROD SPRINGS
Filed Dec. 11, 1953  5 Sheets-Sheet 4

INVENTOR
A. J. BUTTERWORTH
By Young, Emery & Thompson
ATTYS.

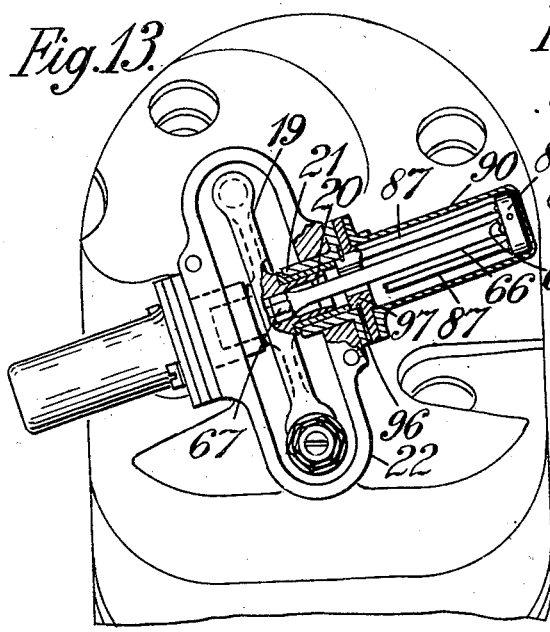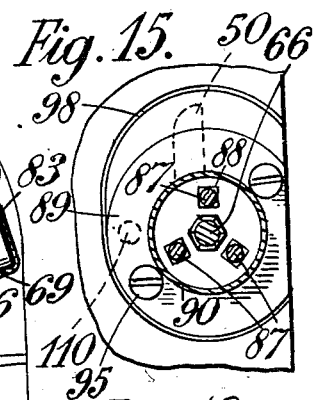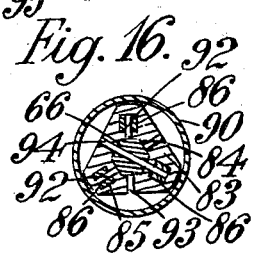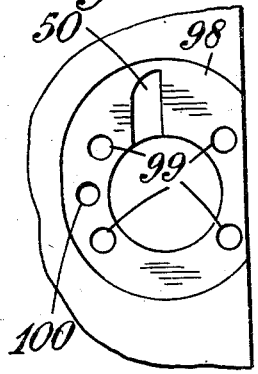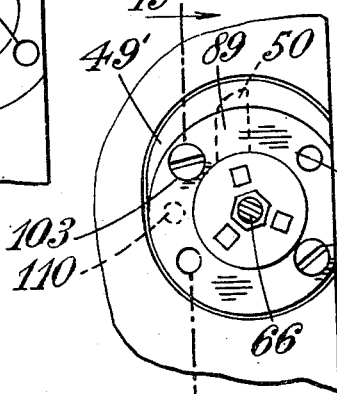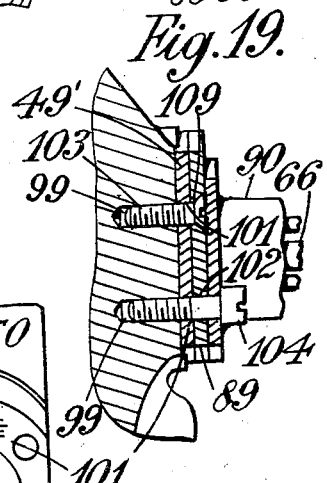

United States Patent Office 2,789,548
Patented Apr. 23, 1957

2,789,548

VALVE GEARS WITH TORSION ROD SPRINGS

Archibald James Butterworth, Frimley, near Aldershot, Hampshire, England

Application December 11, 1953, Serial No. 398,676

Claims priority, application Great Britain December 12, 1952

14 Claims. (Cl. 123—90)

This invention relates to valve gear for internal combustion engines, compressors and the like and of the kind embodying a pivotally mounted rocker having one part thereof which engages or is formed with a valve and another part thereof which is engaged by an operating member, for example by a cam, or by a push rod actuated by a cam and tappet. With such an arrangement, difficulty may be met in obtaining an efficient and reliable working of the mechanism at high operating speed. One cause of such difficulty is the phenomenon of surging in helical valve springs where vibrations of the coils, excited by resonance with the cam frequency or a multiple thereof, cause deflections and stresses beyond those required for the spring to perform its function, and the consequent danger of fatigue failure. An object of the present invention is to overcome that tendency.

According to this invention, a valve gear of the kind referred to above is characterised in that one or more substantially straight torsion rods is or are attached at one end to the rocker arm, at or close to its axis of pivoting and at the other end to a part secured to a fixed part of the mechanism.

The aforesaid torsion rod or rods may be arranged to extend parallel to the axis of pivoting of the rocker and is or are rigidly connected thereto, or the rod or rods may extend at an angle to the axis of pivoting and are connected to the rocker by a universal joint or joints.

Preferably the rocker has an arm extending on either side of its pivot axis which two arms respectively engage the valve and the operating member. With this arrangement the effort required in the case of a vertical engine to lift the valve and to lift that arm of the rocker engaging the valve is balanced or nearly balanced dynamically against the effort to push down the other arm of the rocker and the tappet and push rod should the latter parts be employed. The effect of this partial or complete dynamic balance is that, the load on the rocker bearing, when the valve is being closed, is limited to that caused by the difference between the moments of inertia about the rocker axis of those parts of the valve gear which lie on each side of the axis of pivoting. Not only does this reduction in bearing load and consequent friction reduce the frictional horse power of the engine or compressor as a whole, but it also reduces the normally large margin of spring effort which the designer must provide to overcome friction when returning the mechanism at high speed, to a very small value.

The invention is particularly applicable to valve gear in which one of the arms of the rocker is forked and is arranged to lie within a circumferential groove formed in a part integral with or secured to a valve stem which stem is slidably mounted in a valve guide.

Preferably the part provided with a circumferential groove is adjustable axially along the valve stem, for example, said part may comprise an internally threaded sleeve which engages a threaded part of the valve stem, which sleeve is retained in an adjusted position by a lock nut, which also engages the threaded stem. Preferably, the locking surfaces of the sleeve and nut may be of conical form.

The axis of pivoting of the rocker is preferably so disposed in relation to the other parts of the valve gear, that when maximum acceleration of the valve takes place under the action of the operating member during opening, the line of thrust imparted by the forked extremity of the rocker to said grooved part is parallel to the axis of the valve stem, and perpendicular to the general plane in which the circumferential groove lies. In this way, sliding movement under heavy load between the rocker and said part is reduced to a minimum, with consequent reduction of wear and side thrust on the valve guide. This arrangement also ensures that when the contact pressure between the circumferentially grooved part and the forked rocker arm, due to the thrust of the spring upon return movement of the valve, is the maximum, the line of thrust will again be at right angles to the general plane of the groove, again minimizing wear. It will also be appreciated with the above arrangement that the valve is free to rotate on its own axis and is likely to do so under the random rotational impulses which nearly always occur in such mechanism, thus distributing wear around the surfaces of the circumferential groove.

The aforesaid rocker may be formed with journal portions on either side thereof mounted in bearings in a fixed part of the mechanism, and the aforesaid torsion rod or rods is or are connected to either or both of said journals.

In one form of construction according to the invention, a bore extends axially into said rocker at least a part of which bore is provided with a non-circular contour and a torsion rod is arranged to extend into said bore and has an extremity shaped to interlock with said non circular portion, while the other extremity of the rod is fixed to the outer end of a structure, the inner end of which is attached to a fixed part of the mechanism.

In an alternative arrangement the aforesaid bore may be arranged to extend through both said journal portions and at least center part of the bore is non-circular in contour, and two torsion rods are provided which respectively enter the two journal portions and are shaped at their inner ends to interlock with the non-circular center portion of the bore while the outer end of each of which torsion rods is secured to the outer end of a structure the inner end of which is attached to a fixed part of the mechanism.

In yet a further alternative form of construction at least one of said journal portions is provided with an axially extending bore and there is secured in said bore one part of a pivotal joint, the other part of which is secured to one end of a torsion rod which extends outwardly at an angle to the axis of pivoting of the rocker and the outer end of which torsion rod is secured to a structure attached to a fixed part of the mechanism. This arrangement is particularly suitable for a multicylinder engine where the space between adjacent cylinder heads may not be sufficient to accommodate the required length of torsion rod should the torsion rod extend parallel with the axis of rotation of the rocker, whereas by the provision of a universal joint the torsion rod may be brought clear of any obstructions on the adjacent cylinder.

The aforesaid structure to which the outer end of the torsion rod is anchored may be arranged either to be torsionally rigid or torsionally resilient.

In one form of construction the structure may comprise a tubular element encircling the torsion rod. It will be appreciated that if the wall of such a tube is made sufficiently thin and if it is formed from a suitable material it will itself act as a torsion spring and by contributing to the total deflection required it will permit of the use of a shorter torsion rod than if a rigid tube was employed, since the deflection of such a system for a given stress is in direct proportion to its effective length. However owing to the inherent stiffness of a tube in torsion and the fact that its inside diameter must be sufficiently large to pass the largest diameter of the torsion rod which usually has an enlarged noncircular end for engaging the noncircular part of the tube, it is difficult to manufacture a simple tube which has a low spring rate as compared with the torsion bar it surrounds. For this reason the tube can only contribute a small part of the total deflection required of the spring system unless it is to be unduly frail.

One of the objects of this invention is to provide a structure for attachment to the outer end of a torsion rod having a sufficiently low rate to enable it to contribute a large part, say half of the spring effort and deflection required to close the valve, whilst at the same time being considerably shorter in overall length than the torsion rod to which it is attached. This last point is of importance as in most practical assemblies it is possible to use a greater length of trosion rod than of the surrounding torsion tube. The reason for this is that part of the length of the torsion rod may pass inside the hollow journals of the rocker, whereas the inner end of the torsion tube requires to be anchored to a stationary part of the mechanism outside the dimensional limits of the rocker whereas the outer ends of both the torsion rod and the tube are attached to one another and so occupy approximately the same point along the axis of the assemblage.

The required low rate in the structure to which the outer end of the torsion rod is attached may be obtained in a number of different ways. As indicated above one form of structure to which the outer end of the torsion rod is attached may comprise a tubular element encircling the torsion rod and provided with a number of axially extending slots stopping short of the points of attachment of the torsion rod to the outer end of the tubular element and short of the point of attachment of the tubular element to the fixed part of the mechanism thereby rendering the tubular element torsionally resilient. Preferably the ends of said slots are rounded.

In an alternative form of construction the structure to which the outer end of a torsion rod is secured comprises a socket having a noncircular bore which engages the noncircular end of a torsion rod which socket has attached thereto a number of rod-like members which extend along the torsion rod and are fixed at their inner ends to a base secured to a fixed part of the mechanism.

The following is a description of a number of embodiments of the invention as applied to the valve gear of an internal combustion engine reference being made to the accompanying drawings in which:

Figure 1 is a part elevation and part sectional view of the cylinder head of an engine;

Figure 2 is a part plan and part sectional view looking in the direction of the arrow in Figure 1;

Figure 3 is a section on the lines 3—3 of Figure 1 looking in the direction of the arrows and through two of the cylinder heads of a multicylinder engine;

Figure 4 is a section on the line 4—4 of Figure 3;

Figure 5 is a section through one end of the journal of a rocker showing the form of universal joint connection between it and a torsion rod;

Figure 6 is a section on the line 6—6 of Figure 5;

Figure 7 is a partial section on the line 7—7 of Figure 5;

Figure 8 is a view showing an alternative form of attachment between the outer end of a torsion rod and spring wires attached to a fixed part of the engine;

Figure 9 is a side elevation of a torsion spring assemblage showing an alternative way of mounting the outer torsion rods;

Figure 10 is an end elevation of the assemblage shown in Figure 9;

Figures 11 and 12 are diagrammatic side elevations of alternative forms of outer torsion rods;

Figure 13 is a similar view to Figure 2 showing alternative torsion rod assemblage;

Figure 15 is a section on the line 15—15 of Figure 14;

Figure 16 is a section on the line 16—16 of Figure 14;

Figure 17 is a face view of the boss on the cylinder head which receives the anchor plate for the torsion rod assemblage;

Figure 18 is an end view of the torsion rod assemblage with the cover removed; and Figure 19 is a section on the line 19—19 of Figure 18.

Like reference numerals refer to like parts in the various figures of the drawings.

Figure 14:
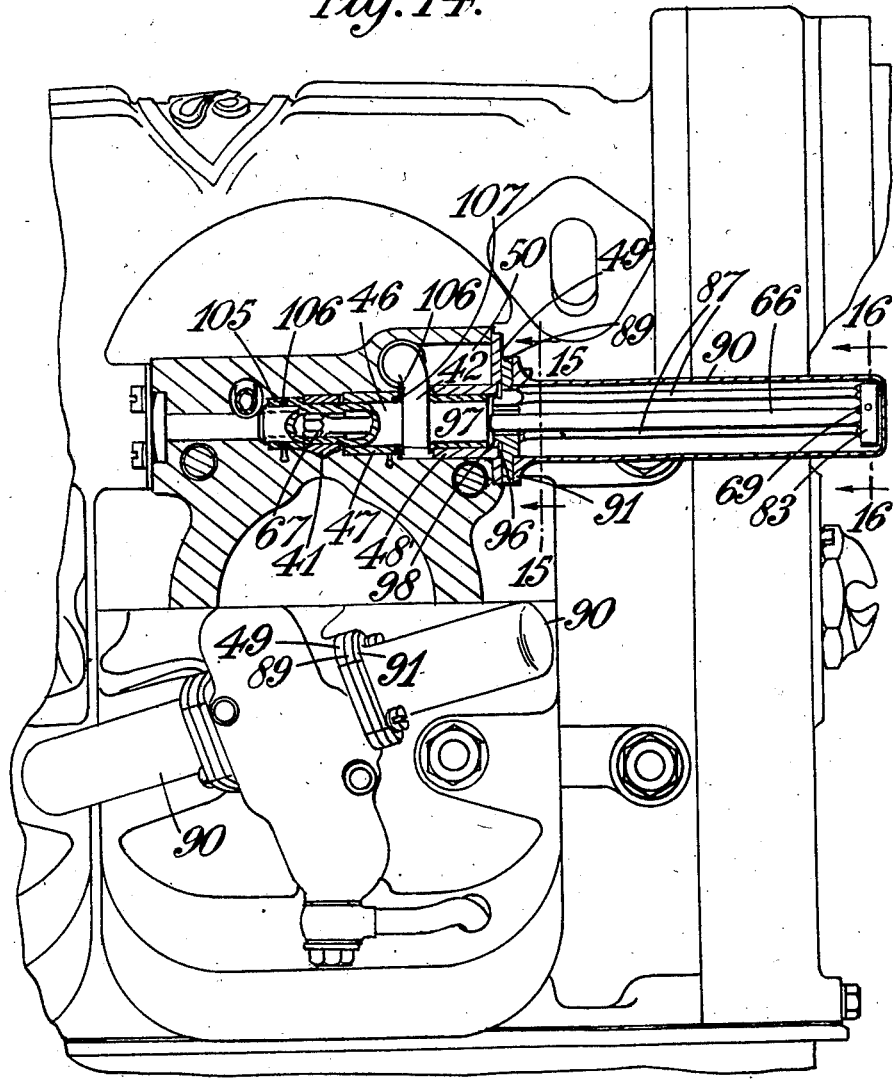
Figure 14 is a similar view to Figure 3 showing a torsion rod assemblage similar to that of Figure 13.

Referring to Figures 1 and 2 the stem 10 of a poppet valve slides in a valve guide 11, ad has a screw threaded extension 12 outside the valve guide. This extension is engaged by an internally threaded sleeve 13 formed with a circumferential groove 14 and with a hexagonal head 15. The outer end face of the head is provided with a conical recess.

A hexagon locknut 16 has a conical projection which enters the aforesaid recess. The end of the valve is provided with a screwdriver slot 17. It will be seen that the position of the sleeve 13 at the valve stem may be adjusted by rotating it relative to the stem and it can be locked in the adjusted position by the nut 16, during which process the slot 17 may be engaged by a screwdriver preventing the valve from rotating.

The circumferential groove 14 on the sleeve is engaged by the forked extremity 18 of a rocker 19. The upper and lower surfaces of the limbs of the fork are so shaped as to permit the small degree of rocking movement relative to the sides of the groove resulting from the pivotal movement of the rocker 19 when opening and closing the valve. The dimensions of the groove and of the forked extremity of the rocker are so selected as to maintain any back lash between the sleeve and the rocker as small as possible.

The other end of the rocker is provided with a socket 37 which is engaged by the end of a push rod 38 which is operated by a cam 39 through a tappet 40. Assuming a normal type of operating cam is used to open the valve there will be a downward positive acceleration of the valve for say the first quarter of its total movement, during which time the lower surfaces of the forked extremity of the rocker and the circumferential groove will be in contact. After this acceleration period the cam follower will be in contact with the top surface of the cam and there will be negative acceleration of the valve controlled by the torsion valve spring about to be described which negative acceleration rises to a maximum value at full valve lift. During this part of the valve opening period, the upper surfaces of the forked extremity of the rocker and of the circumferential groove will be in contact.

It will be appreciated that by suitably proportioning the width of the circumferential groove, and by choosing a suitable position for the axis of pivoting of the rocker it can be arranged that when there is maximum acceleration of the parts during the valve opening and closing period causing heavy pressure between the lower faces of the forked extremity of the rocker and of the circumferential groove the line of thrust is at right angles to the general plane of the groove and parallel with the axis of the valve stem, whereby sliding movement between the contacting faces under heavy load is reduced to a minimum with a consequent reduction of wear and side thrust on the valve guides. Similarly it can be arranged that as the spring pressure approaches its maximum value causing the heaviest contact between the upper faces of the forked extremity of the rocker and of the face of the circumferential groove, the direction of thrust is again at right angles to the plane of the groove and parallel to the axis of the valve.

As seen in Figure 2 the rocker 19 is provided at each side thereof with a journal portion 20, each of which journal portions is supported by a bearing 21, fixed to a casing 22, within which the rocker is disposed and formed integrally with the top of the cylinder head 23. As will be seen from Figure 1, the casing is closed by a cover plate 24. An axial bore extends through both journal portions 20 and through the center part of the rocker and the central part of the bore is formed a hexagonal hole 25 which is engaged by a hexagonal shaped enlarged end 26 of a torsion rod 27, which extends outwardly beyond the end of the journal portion and the outer end of the bearing 21. The outer end of each torsion rod is provided with an enlarged head 28 of hexagonal contour which interengages with a correspondingly shaped socket at the end of a tubular element 29. The inner end of the tubular element is provided with a flange 30 which abuts a flange 31 on the bearing 21 and the two flanges are clamped to the casing 22 by a number of screws 32. Each hexagonal head 28 is retained against axial movement in the tubular element 29 by a small pin 33 which passes through these two parts.

Each of the tubular elements 29 is cut away on either side thereof as indicated at 34 the cut away portions being provided with rounded ends 35.

By these means there are provided between the cut away parts two bars which connect the outer end of each torsion rod 27 to the casing 22 which bars act as torsion members thus enabling considerably shorter torsion rod 27 to be employed than would be the case if the tubular member 29 was not slotted.

The above arrangement of rocker and torsion spring is shown applied to an exhaust valve.

An inlet valve arrangement is shown at the bottom right hand corner of Figure 1 in which the rocker is controlled by a torsion spring system as shown in Figure 3 of the accompanying drawings. The inlet valve head 9 is carried by one arm 41 of the rocker, the other arm 42 of which is displaced laterally from the arm 41 and is formed with a socket 43 which is engaged by a push rod. As in the case of the exhaust valve rocker 19, the inlet rocker 44 is provided with two journal portions 45, 46, the latter being supported in a bearing 47 formed in a part of the cylinder head and the former journal 45 being supported in a bearing 48 formed on a closure member 49 extending over a pocket 50 formed in the cylinder head which closure member 49 is secured in position by suitable screws 51. In the case of the left hand cylinder head of the two cylinder heads shown in Figure 3, the journal portions and rocker are formed with an axially extending bore 52 of hexagonal cross section. Engaging this bore is a hexagonal head 53 formed on one part of a universal joint which part is pivotally connected through an intermediate element 54 to the third element 55 of the universal joint. This latter element is provided with a hexagonal socket for receiving an enlarged hexagonal head 56 formed at the inner end of a torsion rod 57. The outer end of the torsion rod is provided with another enlarged hexagonal head 58 which is accommodated in a similarly shaped socket 59. A half circular groove 60 is formed in the outer surface of a socket 59 and bent round this groove is a steel wire so as to form two limbs 61, 62 which extend back towards the aforesaid closure member 49 and have their ends bent at right angles and clamped between the closure member 49 and a flange formed at the inner end of a tubular cover which flange is attached to the closure member 49 by suitable screws 51. These two wires thus constitute additional torsion members.

A cover (not shown) may also be provided for the previously described assembly for the purpose of preventing leakage of oil and to lessen the danger of accidental damage of the somewhat delicate parts.

An alternative form of universal joint for connecting the torsion rod 57 to the journal portion 45 is shown in Figures 5, 6 and 7. In this instance, the end of the torsion rod is flattened at 63, and passes through a slot 64 formed in a pin 65 which is rotatable in holes 66 formed on opposite sides of the journal portion 45. It will be appreciated with either of the arrangements last described that the torsion rod may extend in an inclined manner in relation to the axis of pivoting of the rocker, and therefore, can be brought clear of the part of the adjacent cylinder head in which the other rocker is mounted.

The cylinder head shown to the right of Figure 3 is an end cylinder head and thus the torsion rod 66 controlling its inlet valve can be arranged coaxially with the axis of pivoting of the rocker. The rocker in this instance is similarly mounted to that last described, but the torsion rod 66 extends to the end of the inner journal portion 46 where it is provided with an enlarged hexagonal head 67, which engages a similarly shaped socket formed at the end of the journal portion 46. Thus the extent of projection of the torsion rod from the side of the cylinder head is less than the overall length of the torsion rod 66. The outer end of the torsion rod is provided with an enlarged hexagonal head 69 which engages a similarly shaped socket at the end of the tubular element 34, in a similar manner to that described in Figures 1 and 2, and as in the previously described construction, the tubular element is cut away at 34 so as to leave two torsion bars 70 of substantially rectangular cross section, as shown in Figure 4, connecting the socket portion of the tubular element to a flange 71 at its other end which flange is secured to the closure member 49.

Figure 8 shows an alternative form of attachment of the wire springs to the socket 59 which engages the end of the torsion rod 57. In this case a hexagonal hole 72 is blanked or broached in the centre of a steel plate 73, and two circular holes 74 are pierced each side of it, through which the bent over ends of the wires may pass. In this case axial location of the torsion bar is obtained by a cross pin 75.

Whereas a single length of wire forming two torsion bars is shown in the drawing, two or more such wires may be employed, their ends crossing one another at the outer extremity of the assemblage, or a plurality of separate wires may be attached, for example, by welding or clamping to a socket engaging the end of the torsion rod without the feature of the wire being bent back on itself, and similar means of attachment may be used for the flanged inner ends.

As an alternative to welding or clamping the outer torsion wires or torsion bars 76, these, as shown in Figures 9 and 10 may themselves be made square, hexagonal or serrated at their ends and may be pressed into suitably shaped holes in the inner and outer end plates, 77, 78, axial location being effected either by the tightness of the fit or by cross pinning at 79.

A further alternative construction is shown in Figure 11 where the secondary or outer torsion spring or springs is each made up of a number of thin spring steel laminations 80. In this case it may be desirable to prevent adjacent laminations from chafing against one another, and this may be achieved by inter-leaving them with short metal strips 81 at each end leaving a gap between adjacent laminations over their working length, or by reducing the thickness of each lamination at 82 except at the ends where they are restrained or clamped as shown in Figure 12.

In Figures 13 to 19 is shown an arrangement in which three additional torsion rods 87 are provided, grouped around the main torsion rod 66. Figure 13 shows a torsion rod arrangement suitable for controlling an exhaust valve operated by a rocker 16 which is mounted in a similar manner as that described with reference to Figure 2. Figures 14 to 16 show a similar torsion rod for controlling an inlet valve operated by a rocker 42, mounted in a similar way to that described with reference to the right hand inlet valve shown in Figure 3. Where it is desired to prevent ingress of oil, for example to an induction passage, past the oil impregnated porous bushings 47, 105 supporting the rocker shaft 46 oil sealing rings 106 of circular or other section may be fitted in recesses in the bushes the recess in the bushing 47 being closed by a hardened steel washer 107 so that suction of any appreciable amount of oil is prevented, while at the same time replenishment of the oil-impregnated porous bushings is permitted by percolation through the outer portion of the bushing diametrically outside the oil sealing rings.

The torsion rod arrangement for both the inlet and exhaust valve comprises a central torsion rod 66 having an enlarged hexagonal shaped head 67 at one end, which engages a hexagonal bore in the rocker shaft and provided at the other end with an enlarged hexagonal head 69 which engages a central hexagonal hole 84 in a plate 83. Grouped around the hexagonal hole are three square holes 85, one opposite every second flat of the hexagon. These holes are engaged by the enlarged ends 86 of three secondary torsion rods 87, which enlarged ends are square in cross section. The other ends of the secondary torsion rods are also enlarged at 88 and are of square section and engage square holes in an anchor plate 89 fixed to the closure member 49. The assemblage is encircled by a tubular casing 90 closed at the outer end and having a flange 91 at the inner end and clamping screws 95 extend through this flange through the anchor plate 89 and engage the closure member 49.

As will be seen from Figure 16 two of the square heads 86 are secured in their holes 85 by short pins 92 which are introduced into holes formed in the square heads through holes 93 formed in the plate 83, and this is effected before the introduction of the enlarged hexagonal head 69 of the main torsion rod 66 into the hole in the plate 83. The head 86 of the third secondary torsion rod 87 is secured in position in the remaining square hole in the plate 83 by a pin 94 which extends from one side of the plate completely through the enlarged head 67 of the main torsion rod 66, and then into the hole in the head 86 of the secondary torsion rod. This pin 94 may be secured in its hole by centre-punching, or similarly. Each of the holes in the plate 83 for the pins 92, 94 at one end terminate short of the edge of the plate. As will be seen from Figure 16 the plate is substantially triangular in shape with rounded corners which may be supported by the surrounding casing 90. The inner enlarged ends 86 of the torsion rods 87 are held against axial movement in the holes in the anchor plate by means of a circlip 96 which is located in a groove formed in a spigot 97 on the anchor plate 89 which groove intersects each square hole and enters a slot formed in each of the square ends 88 of the secondary torsion rods 87.

To provide an accurate means of locating and preloading the torsion bar 66, the sunk facing 98 (see Figure 17) on the cylinder head which carries the outer rocker bushing 48' has four tapped holes 99 and one dowel hole 100 surrounding the bore which houses the bushing 48'.

A dowel 110 is fitted in this hole (see Figure 18) and engages a hole in the flange 49' of the bushing 48' and gives an angular location to the bushing 48' when assembled. This aligns four reamed holes 101 in the flange 49' of the bushing with the four tapped holes 99 mentioned above, the reamed holes being slightly larger in diameter than the major diameter of the tapped holes. The anchor plate 89 of the spring assembly carries four holes 102 in the same geometric pattern but arranged in such an angular relationship to the inner hexagonal end 67 of the torsion bar 66, assuming the various parts of the torsion spring to be assembled together, that to bring them into alignment with the reamed holes 101 in the bearing flange after inserting the torsion bar 66 into the valve rocker 46 and bringing the anchor plate 89 into contact with the flange 49' of the bushing, will "wind up" the torsion rod 66 and apply the necessary pre-load to the valve gear, this angle normally being approximately equal to the working angle of the valve rocker.

Two of the holes in the anchor plate 89 may be drilled or reamed the same diameter as the reamed holes 101 in the bushing flange, and two other opposite holes are countersunk or taper-reamed to an included angle in this case of 60°. A special tool may be engaged with the two former holes permitting a torque to be applied to the spring assembly and thus aligning the counter-sunk holes with the corresponding holes in the bushing flange. The tool must be so shaped as to leave access to these counter-sunk holes.

Two special screws, 103 (one of which is shown in Figure 19) threaded to suit the tapped holes 99 in the cylinder head and having a parallel portion 109 to engage the reamed holes 101 and 60° counter-sunk heads are screwed into the counter-sunk holes and on being tightened down will pull the assembly firmly together and at the same time complete the accurate angular location of the anchor plate 89. The flanged tubular cover 90 which may be, for example, an aluminium casting, is then fitted over the spring assembly and two drilled or reamed holes in it are aligned with the remaining holes in the anchor plate. Screws 104 are then passed through these holes and tightened down to complete the assembly.

I claim:

1. An engine valve gear comprising a valve operating rocker, a mounting in which said rocker is oscillatably mounted, an operating element engaging a part of said rocker so as to apply rocking movement to it, a substantially straight torsion rod, a connection between one end of the torsion rod and rocker, whereby rocking movement rotates said end, a connection between the other end of said torsion rod and a part permanently fixed in relation to said mounting.

2. An engine valve gear comprising a valve operating rocker, a mounting in which said rocker is oscillatably mounted, an operating element engaging a part of said rocker so as to apply rocking movement to it, a substantially straight torsion rod, a connection between one end of the rod and said rocker whereby rocking movement rotates said end, a connection between the other end of the rod and one part of a torsionally resilient unit, another part of which unit is permanently fixed in relation to said mounting.

3. An engine valve gear according to claim 2 wherein said torsion rod is arranged co-axially with the axis of rotation of the rocker and wherein said first connection rigidly secures the rod to the rocker.

4. An engine valve gear according to claim 2 wherein said torsion rod is arranged to extend at an angle to the axis of rotation of said rocker and wherein the first said connection comprises an articular joint.

5. An engine valve gear according to claim 2 wherein said rocker is provided with an arm extending on each side thereof, one of which arms is arranged to be engaged by the operating element and the other of which is arranged to operate the valve.

6. An engine valve gear according to claim 2 wherein said rocker comprises an arm disposed on each side thereof, one of which arms is engaged by said operating element, a valve stem, a connection between the valve stem and said other arm, which connection comprises a fork on said other arm, a collar axially adjustable along the valve stem, which collar is formed with a circumferential groove into which the limbs of the fork extend.

7. An engine valve gear according to claim 2 wherein said valve operating rocker is provided with arms extending on each side thereof, one of which arms is engageable by said operating element, a screw threaded valve stem, a threaded sleeve in engagement with said valve stem and having a conical depression at one end thereof, a lock nut engageable with said stem and having a conical part engageable with said depression and which sleeve is provided with a circumferential groove, and the other of which arms on said rocker arm has a forked extremity engageable with said circumferential groove.

8. An engine valve gear comprising a valve operating rocker having journal portions extending from either side thereof, a mounting in which said journal portions are oscillatably mounted, an operating element engaging a part of said rocker, so as to apply rocking movement to it, a substantially straight torsion rod extending away from each journal portion, a connection between one end of each rod and one of the journal portions whereby rocking movement rotates said end, a connection between the other end of each rod and one part of a torsionaly resilient unit, another part of each of which unit is fixed in relation to said mounting.

9. An engine valve gear comprising a valve operating rocker, having a hollow journal portion, a mounting in which said journal portion is oscillatably mounted, an operating element engaging a part of said rocker so as to apply rocking movement to it, a substantially straight torsion rod, one end of which extends into said hollow journal portion, which end and the bore in the hollow journal portion are provided with inter-engaging non-circular portions whereby rocking movement of the rocker rotates said end, a connection between the other end of the torsion rod and one end of the torsionally resilient unit, the other part of which is fixed in relation to said mounting.

10. An engine valve gear comprising a valve operating rocker having a hollow journal portion, a mounting in which said journal portion is oscillatably mounted, an operating element engaging part of said rocker so as to apply rocking movement to it, a substantially straight torsion rod extending from the journal portion at an angle to the rocking movement, an articular joint one part of which is disposed within the hollow journal portion and interlocks therewith, another part of which is connected to one end of said torsion rod, a connection between the other end of the rod and one part of a torsionally resilient unit, another part of which is fixed in relation to said mounting.

11. An engine valve gear according to claim 2 wherein the torsionally resilient unit comprises a tubular element encircling the torsion rod, means for securing one end of the unit to said mounting, means for securing the other end of the element to the outer end of the rod, which tubular element is slotted to render it torsionally resilient.

12. An engine valve gear according to claim 2 but in said torsionally resilient unit comprises a number of bars extending parallel with the aforesaid torsion rod and wherein the connection between the torsion rod and the unit comprises a head fixed to the end of the torsion rod and extending on either side thereof, and having sockets in which one end of said bars are fixed, and wherein a part fixed in relation to said mounting is provided with sockets with which the other ends of said bars are fixed.

13. An engine valve gear comprising a valve-operating-rocker, having a hollow journal portion, a mounting in which the journal portion is oscillatably mounted, an operating element engaging a part of said rocker so as to apply rocking movement to it, a substantially straight torsion rod, one end of which is of hexagonal contour which extends into and engages a hexagonal socket formed in the hollow journal portion, the other end of which rod is of similar hexagonal contour to the first and a plate having a hexagonal socket engaging said hexagonal end of the rod and having three sockets of square configuration, grouped around the end of the rods, three subsidiary rods extending parallel with the torsion rod, and grouped evenly around it, each of which rods is of circular cross-section and provided with squared ends, one end of each rod engaging a square socket in the plate and the other end of each rod engaging a square socket formed in a part fixed to the mounting.

14. An engine valve gear comprising a valve-operating-rocker having a hollow journal portion, a mounting in which said rocker is oscillatably mounted, an operating element engaging a part of said rocker so as to apply rocking movement to it, said mounting having a flat outer face, a bearing in said mounting supporting said journal and having a flange overlying said flat outer face, a substantially straight main torsion rod one end of which extends into the bore of the hollow journal portion, which parts are shaped to interlock with one another, a head having a socket therein which is engaged by the other end of the rod which parts are also arranged to interlock with one another, an anchor plate abutting the outer face of the aforesaid flange, a plurality of subsidiary torsion rods grouped around the main torsion rod, sockets in said head and in the anchor plate engaging the ends of the subsidiary torsion rods and in interlocking engagement therewith, which flat face of the mounting is formed with a group of four threaded holes and said flange and anchor plate are each provided with a similar set of holes, means for registering the holes in said flange with the holes in the flat face and which group of holes in the anchor plate are so disposed in relation to the sockets therein that when said main and auxiliary torsion rods are unstrained, the holes in the anchor plate are out of register with those in the flange and flat face, and thus require the rods to be loaded to effect registration, two screws extending through the holes in the anchor plate and engaging two of said threaded holes, an outer casing encircling the torsion rod assemblage and having a flange abutting the anchor plate and provided with two holes for registering with the other two holes in the end of the anchor plate and a flange and screws extending through said holes and engaging the other two holes in the flat face of the mounting.

References Cited in the file of this patent

UNITED STATES PATENTS

| | | |
|---|---|---|
| 1,988,018 | Peterson | Jan. 15, 1935 |
| 2,041,539 | Gaultier | May 19, 1936 |
| 2,100,057 | Krebs | Nov. 23, 1937 |
| 2,398,207 | Chilton | Apr. 9, 1946 |
| 2,401,480 | Halliday | June 4, 1946 |

FOREIGN PATENTS

| | | |
|---|---|---|
| 511,272 | Great Britain | Aug. 15, 1939 |
| 727,124 | Germany | Oct. 26, 1942 |
| 816,032 | Germany | Oct. 8, 1951 |